(12) United States Patent
Wiatrowska et al.

(10) Patent No.: US 10,955,567 B2
(45) Date of Patent: Mar. 23, 2021

(54) SCINTILLATING NANOCOMPOSITES

(71) Applicant: KONINKLIJKE PHILIPS N.V., Eindhoven (NL)

(72) Inventors: Aneta Wiatrowska, Wroclaw (PL); Herfried Karl Wieczorek, Aachen (DE); Cornelis Reinder Ronda, Aachen (DE); Wilhelmus Cornelis Keur, Weert (NL); Malgorzata Nachman, Stargard Szczecinski (PL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 65 days.

(21) Appl. No.: 15/771,163

(22) PCT Filed: Nov. 7, 2016

(86) PCT No.: PCT/EP2016/076763
§ 371 (c)(1),
(2) Date: Apr. 27, 2018

(87) PCT Pub. No.: WO2017/084898
PCT Pub. Date: May 26, 2017

(65) Prior Publication Data
US 2018/0306933 A1 Oct. 25, 2018

(30) Foreign Application Priority Data
Nov. 19, 2015 (EP) ..................... 15195392

(51) Int. Cl.
*G01T 1/203* (2006.01)
*G21K 4/00* (2006.01)
(Continued)

(52) U.S. Cl.
CPC ............ *G01T 1/2033* (2013.01); *C09K 11/02* (2013.01); *C09K 11/025* (2013.01);
(Continued)

(58) Field of Classification Search
None
See application file for complete search history.

(56) References Cited

U.S. PATENT DOCUMENTS 7,608,829 B2 10/2009 Loureiro
2006/0054863 A1 3/2006 Dai
(Continued)

FOREIGN PATENT DOCUMENTS

EP 2397453 12/2011
WO 2007/120443 10/2007
(Continued)

OTHER PUBLICATIONS

Saladino, et al., "Ce:YAG Nanoparticles Embedded in a PMMA Matrix: Preparation and Characterization"; Langmuir 2010, 26(16), 13442-13449.
(Continued)

*Primary Examiner* — Edwin C Gunberg
(74) *Attorney, Agent, or Firm* — Larry Liberchuk

(57) ABSTRACT

An improved scintillator nanocomposite comprising nanoparticles with scintillating properties and a diameter between 10 and 50 nanometer and a first matrix material comprises is obtained by introducing the nanoparticles into a dispersing medium to form a stable suspension. The dispersing medium is a precursor to the first matrix material, which is cured to form the first matrix material.

20 Claims, 4 Drawing Sheets

(51) Int. Cl.
- *C09K 11/77* (2006.01)
- *G01T 1/16* (2006.01)
- *C09K 11/02* (2006.01)
- *B82Y 15/00* (2011.01)
- *B82Y 20/00* (2011.01)
- *B82Y 40/00* (2011.01)

(52) U.S. Cl.
CPC ...... *C09K 11/7721* (2013.01); *C09K 11/7774* (2013.01); *G01T 1/1606* (2013.01); *G01T 1/203* (2013.01); *G21K 4/00* (2013.01); *B82Y 15/00* (2013.01); *B82Y 20/00* (2013.01); *B82Y 40/00* (2013.01)

(56) References Cited

U.S. PATENT DOCUMENTS

| | | |
|---|---|---|
| 2006/0216508 A1 | 9/2006 | Denisyuk |
| 2008/0128624 A1* | 6/2008 | Cooke ............... G01T 1/2023 250/361 R |
| 2008/0237470 A1 | 10/2008 | Loureiro |
| 2010/0207139 A1* | 8/2010 | Winkler ............ B82Y 20/00 257/98 |
| 2011/0210658 A1 | 9/2011 | Pan |
| 2012/0286166 A1 | 11/2012 | Osinski |

FOREIGN PATENT DOCUMENTS

| | | |
|---|---|---|
| WO | 2009/054946 | 4/2009 |
| WO | 2010048523 | 4/2010 |
| WO | 2014/005753 | 1/2014 |
| WO | 2014/158018 | 10/2014 |

OTHER PUBLICATIONS

Fadlalla, et al., "Sol-gelpreparation and photoluminescence properties of Ce3+-activated Y3Al5O12 nano-sized powders"; Journal of Crystal Growth 311(2009) 3737-3741.

\* cited by examiner (a)

(b)

SCINTILLATING NANOCOMPOSITES

CROSS REFERENCE TO RELATED APPLICATIONS

This application is the U.S. National Phase application under 35 U.S.C. § 371 of International Application No. PCT/EP2016/076763, filed Nov. 7, 2016, published as WO 2017/084898 on May 26, 2017, which claims the benefit of European Patent Application Number 15195392.4 filed Nov. 19, 2015. These applications are hereby incorporated by reference herein.

FIELD OF THE INVENTION

The present invention generally relates to a method for producing a scintillator nanocomposite, a scintillator nanocomposite, a product comprising a scintillator nanocomposite, a method to produce a transparent scintillator, a transparent scintillator, a radiation detector and an imaging system.

BACKGROUND OF THE INVENTION

Radiation detection materials, such as phosphors, are used in many applications, e.g. as scintillator materials in security or medical scanners, such as x-ray, CT, PET or SPECT scanners. These materials are usually used in single crystal form, which are restricted in size due to synthesis method limitations.

Composites of nanoscale materials bypass the limitations of single crystals and are an interesting approach of developing radiation detectors. Composite materials may be produced in a variety of shapes and sizes. The cost of scintillator production may be significantly reduced, as well. Furthermore, composites filled with nano-sized filler materials have higher surface-to-volume ratio than conventional composites with micro-sized fillers.

Scintillator nanocomposites 10 are commonly prepared starting from nanoparticles 12 with scintillating properties in powder form, which are dispersed in a dispersing agent or in a pre-polymer, which forms a polymeric matrix 11 in which the nanoparticles are distributed (see FIG. 1a for a configuration of a scintillator nanocomposite 10 with well-dispersed nanoparticles).

However, a significant limitation to the use of nanocomposite materials in radiation detection is that it is very difficult to obtain uniform dispersion and compatibility in known scintillator nanocomposites (see FIG. 1b). This is partly because to be able to properly disperse the nanoparticle powder into the pre-polymer a dispersion agent and/or a solvent is used that needs to be removed before polymerization. However, this is an extremely difficult process and any unwanted material left in the scintillator causes internal disruptions 14 of the matrix structure such as inclusions and/or voids that lowers transparency and quality of the scintillator nanocomposites. Furthermore, it is difficult to introduce a large amount of nanoparticles 12 into any matrix material 11. More dispersing agent and/or solvent might be necessary, making it even more difficult to remove these, thereby increasing the problem. The higher nanoparticle content may lead to increased nanoparticle agglomeration in composite.

Also, for many optical applications, such as radiation detectors, nanoparticle powder size is restricted to the range of 10-50 nm. Such particles have a small enough light scattering coefficient to obtain (partly) transparent nanocomposites. However, nanoparticle powders with such a small size normally strongly agglomerate into larger agglomerate structures 13 and resulting in that a required transparency is not obtained. In WO2009/054946 agglomeration of nanophosphor scintillators in a matrix material is addressed by surface modification of nanophosphor particles using ligands that allow for isolating surface charges or direct chemical bonding to the matrix material. However, such nanoparticles need to be specifically modified, making their production more complex and the particles more expensive. Also, the ligands may have an influence on scatter and absorption properties.

On top of that, dopants used in scintillator materials, such as Cerium dopants, that are present at the surface of the scintillator material cause increased formation of surface defects 15 that reduce light emission and therefore result in lower quality scintillators.

SUMMARY OF THE INVENTION

It is one objective of the present invention to obtain a high quality transparent scintillator composite from nanoparticle powders and a production process that is less complicated and results in a higher yield of high quality scintillator materials. Further objectives and advantages are mentioned throughout the description.

This objective is achieved by a method for producing a scintillator nanocomposite comprising nanoparticles with scintillating properties and a diameter between 10 and 50 nanometer and a first matrix material, said method comprising the steps of introducing the nanoparticles into a dispersing medium to form a stable suspension, wherein the dispersing medium is a precursor to the first matrix material and curing the dispersing medium to form the first matrix material. By using a precursor to the first matrix material as a dispersing agent, it does not have to be removed, obviating a process step that is energy consuming and, even more importantly, causes defects in the final product that deteriorates transparency of the scintillator nanocomposite. Because of this the nanocomposite obtained by the method of the present invention are of higher quality than nanocomposites obtained from known production methods.

In a preferred embodiment of the present invention the scintillator nanoparticles are garnet nanoparticles, preferably Cerium-doped nanoparticles, most preferably nanoparticles chosen from the group of $Y_3Al_5O_{12}$:Ce (YAG:Ce) nanoparticles, $(Lu,Gd)_3Al_5O_{12}$:Ce (LGAG:Ce) nanoparticles or $(Lu,Gd)_3(Al,Ga)_5O_{12}$:Ce (LGGAG:Ce) nanoparticles. These are garnets that are known to be very suitable in, for instance, medical or security imaging.

In a preferred embodiment of the present invention the dispersing medium is a glycol, preferably 1,4 butanediol. This is a particularly suitable precursor for a polyurethane matrix material.

In a preferred embodiment of the present invention a second dispersing medium is mixed with the first dispersing medium prior to introducing the nanoparticles or to the stable suspension. The second dispersing medium is a precursor for a second matrix material. In some instances a second matrix material may be used to achieve further enhanced properties, for instance optical or mechanical properties. The first and second matrix material may be cured in a single matrix material (e.g. a copolymer). Again it is beneficial to use a dispersing agent that reacts into the matrix material instead of one that needs to be removed.

In a preferred embodiment of the present invention the first or second matrix material is a polymeric material, preferably a polymeric material selected from the group of polyurethane, polyester, such as polybutylene terephthalate, unsaturated polyester resin, aromatic polyamide, aromatic polyimide, polystyrene or polysulfone. Polymers are often very good to process and there are enough choices for precursor or precursor combinations that are compatible with nanoparticles and have optical properties to make them suitable for various optical applications, such as radiation imaging.

In a preferred embodiment of the present invention the curing is performed at elevated temperature, preferably between 220 and 250 degrees Celsius, more preferably at about 225 degrees Celsius, and/or at elevated pressure, preferably a pressure greater than 20 bar, most preferably a pressure of about 40 bar and/or for at least 24 hours. These are particularly favorable reaction conditions for polymeric matrix materials such as polyurethanes.

In a preferred embodiment of the present invention the obtained nanocomposite has a polyurethane gel matrix material. Polyurethanes can be relatively easily formed into many different shapes for a high number of applications.

The present invention is further directed to producing and obtaining transparent scintillator that has improved quality and may be used in for instance a radiation detector that may be applied in an imaging system.

Still further aspects and embodiments of the present invention will be appreciated by those of ordinary skill in the art upon reading and understanding the following detailed description. Numerous additional advantages and benefits will become apparent to those of ordinary skill in the art upon reading the following detailed description of preferred embodiments.

BRIEF DESCRIPTION OF THE DRAWINGS

The present invention is illustrated by drawings of which
FIG. 1a, b show schematic depictions of a well-dispersed scintillator nanocomposite (1a) and a scintillator nanocomposite with several defects (1b).

Figure 1A:
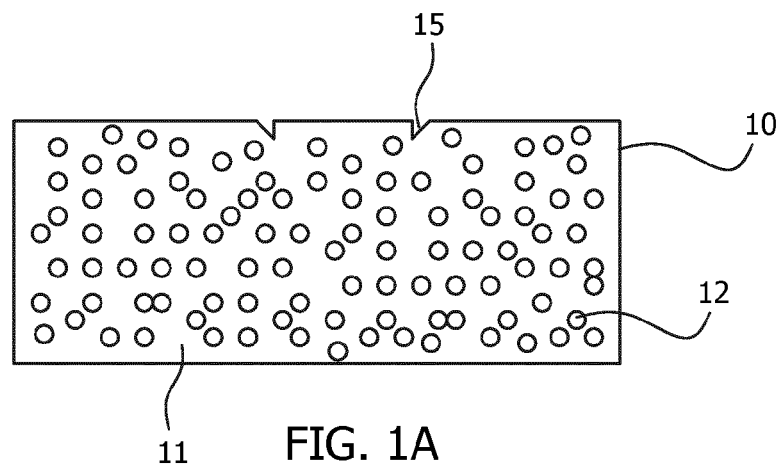
Figure 1B:
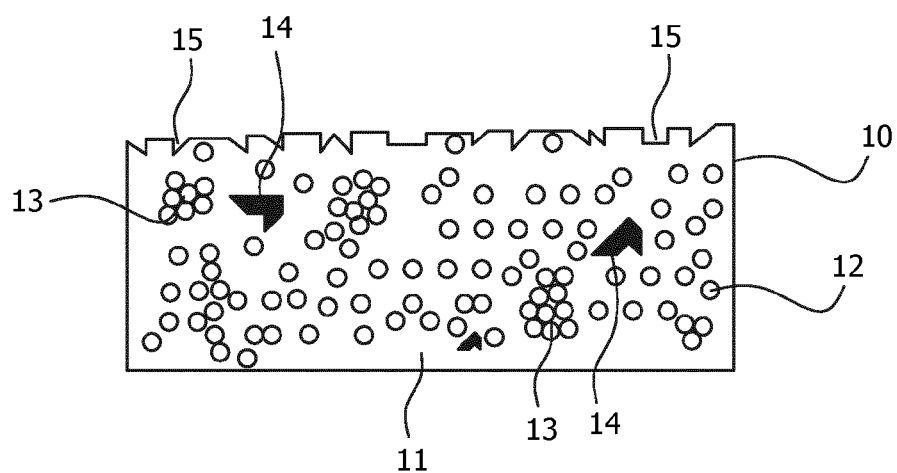
Figure 2:
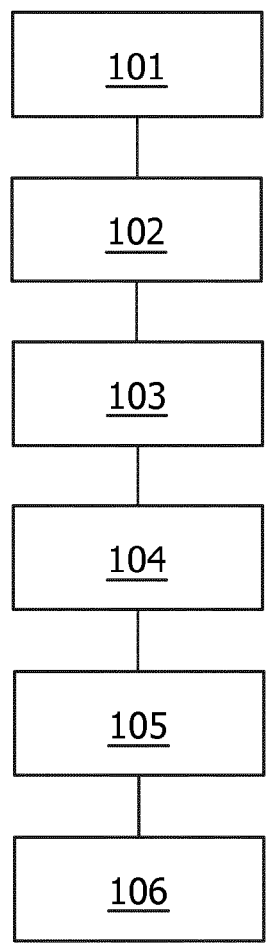
FIG. 2 shows a combined flowchart of a method for producing scintillator nanocomposites, a method for producing a transparent scintillator and a method to construct a radiation detector, all according to the present invention.

The invention may take form in various components and arrangements of components, and in various process operations and arrangements of process operations. The drawings are only for the purpose of illustrating preferred embodiments and are not to be construed as limiting the invention. To better visualize certain features may be omitted or dimensions may be not be according to scale.

DETAILED DESCRIPTION OF EMBODIMENTS

Several types of scintillator nanoparticles are known, for instance garnet-based nanoparticles. The present invention is illustrated, but not limited to, with several specific scintillating nanoparticles as examples, but a skilled person would know how to prepare and use other types of scintillator nanoparticles as well.

To obtain a scintillator nanocomposite 10 the scintillator nanoparticles 12 need to be embedded in a matrix 11, here illustrated with a polymeric matrix. As mentioned earlier, known scintillator nanocomposites are prepared by dispersing the nanoparticles in a precursor material that is formed into the matrix, e.g. monomers that may be (co-)polymerized into a polymer matrix. Non-polymeric precursors are possible as well, for instance inorganic pre-cursors that may be cured in inorganic matrix materials, e.g. glass-like structures.

The refractive index of the scintillator nanoparticles and the matrix must match to be suitable in optical applications, such as radiation detectors. This is however not trivial, since nanoparticles usually have a higher refractive index than most polymers. For example, the refractive index of $Y_3Al_5O_{12}$:Ce nanoparticles particles is 1.8, and usually polymers have refractive indexes no higher than 1.7 (e.g. polyurethane has a refractive index of approximately 1.5). High refractive index polymers are rare and expensive. The refractive index of the polymer matrix might be increased by introducing inorganic particles such as $TiO_2$ or $ZrO_2$, but the amount of inorganic material would need to be very high and will cause even more defects in the nanocomposite, contributing even more to the problem the present invention intends to solve. A better solution is to use scintillator nanoparticles with a very small diameter. Since scattering intensity depends on the particle diameter to the 6th power (Rayleigh's equation), only the particles with a size smaller than the wavelength of visible light do not interfere with incident light and in the end composite does not appear turbid. Especially, nanoparticles smaller than 50 nm in a matrix appear transparently to the human eye.

Unfortunately, such small nanoparticles have a strong tendency to form agglomerates 13 due to van der Waals forces resulting from their relatively large surface area. The agglomerates 13 usually grow to several hundred nanometers in size and act like submicron particles that scatter incident light and reduce transparency of nanocomposite, which is strongly detrimental to the transparency and quality of the scintillator nanocomposite.

The present invention presents a production method resulting in a transparent scintillator nanocomposite that more homogenously distributes nanoparticles smaller than 50 nm in a matrix, while at the same time reducing defects caused by dispersants or solvents used in known methods to produce nanoparticle dispersions used in scintillator nanocomposite production.

First, scintillator nanoparticles are prepared 101 using any of the many known scintillator nanoparticle synthesis methods.

Next, the nanoparticles are dispersed 102 in an organic medium. It is an insight of the present invention that this organic medium is a precursor material to form (at least part of) the matrix material, for instance a monomer that may be (co-)polymerized into a polymer matrix. There are many requirements to the organic material and resulting matrix material, which makes selecting the right organic medium non-trivial. First, the organic medium should disperse the scintillator nanoparticles to form a stable suspension with a solid content of up to 50%. Secondly, the resulting matrix material (such as a polymer) needs to be radiation hard, be compatible with and have a refractive index matching any other materials present in the nanocomposite (e.g. polymers with which it may or may not form a co-polymer) and preferably also is not overly expensive or difficult to obtain. Surprisingly, it was found that glycols and particularly 1,4-butanediol [$HO-(CH_2)_4-OH$] possess the required properties to be used as organic medium that may be (co-)polymerized into suitable polymeric matrix materials, such as polyurethanes or polyesters. 1,4-Butanediol is furthermore very attractive to use for Cerium-doped scintillator materials, since 1,4-butanediol has a stabilizing influence on $Ce^{3+}$ and nanoparticles. This later results in less surface defects 15 in the nanocomposite 10 caused by Cerium migration.

Examples of alternate precursor materials are precursors for aromatic polyamide or aromatic polyimide, such as dianhydride, diamine, N,N-dimethylacetamide (DMAc) or N-methylpyrrolidinone (NMP), precursors for polystyrene, such 4,4'-azobis 4-cyanovaleric acid (ACVA), polyvinyl pyrrolidone (PVP) or precursors for polysulfone, such as diphenol (bisphenol-A or 1,4-dihydroxybenzene) and bis(4-chlorophenyl)sulfone. As mentioned before, also inorganic precursors are considered.

The suspension of the precursor material with the nanoparticles is then cured 103 into the matrix material. To polymerize a glycol another monomer (e.g. an isocyanate or a dicarboxylic acid) needs to be added to form, for instance, a polyurethane or a polyester. This polymerization mechanism is commonly known. Other reagents, such as co-monomers to form copolymers and catalysts may be used. Using dibutyltin dilaurate (DBTDL) as a catalyst is preferable, since this catalyst is known to decrease reaction time. Using 1,6-diisocyanatohexane (HDI) as an isocyanates source is preferable since it may increase transparency and allows for an increased amount of nanoparticles in the matrix. The presence of nanoparticles does not significantly influence the reaction conditions or the resulting polymer, except that after polymerization the nanoparticles 12 are embedded in the polymer matrix 11 in a homogeneous manner with less or at least smaller agglomerations 13 and with less disruptions 14 of the matrix and less surface defects 15 (for instance as is schematically shown in FIG. 1*a*).

The polymerization reaction is performed in a pressurized oven, such as an autoclave. The temperature must be near or above the boiling point of the organic medium. For 1,4-butanediol this provides a temperature window of 220 to 250 degrees Celsius, with a preferred working temperature of 225 degrees Celsius. High pressure must be applied, at least greater than 20 bar, preferably about 40 bar and the reaction must be kept under these conditions for at least 24 hours to obtain well-cured and well-dispersed scintillator nano composites.

To be able to obtain good quality nanocomposites all starting materials must be dehydrated and degassed (preferably at a temperature between 100 and 150 degrees Celsius) to avoid inclusions or defects in the nanocomposite. Especially any presence of water makes it very difficult, or even impossible, to obtain scintillator nanocomposites, since with water present the polymerization reaction would be too fast and nanoparticles are very difficult to add controllably.

Because no defects are caused by insufficient or ineffective solvent removal, nanoparticle composites are obtained with improved transparency and quality. This can be improved even further by melting 104 the obtained nanocomposite and injection molding 105 the molten composite. The fast melting and violent cooling of this process may reduce further defects. This is especially effective in case the nanocomposite comprises polymers with a block structure with harder and softer segments linked together, such as for instance is the case with polyurethanes. Transparency before injection molding is not yet optimal because the segments have a high polarity and therefore have a strong tendency to agglomerate, resulting in (pseudo)-crystallite structures that reduce transparency. Crosslinks between the segments disappear upon heating and injection, which prevents crystallites from growing, resulting in greatly enhanced transparency of the nanocomposites.

Figure 3:
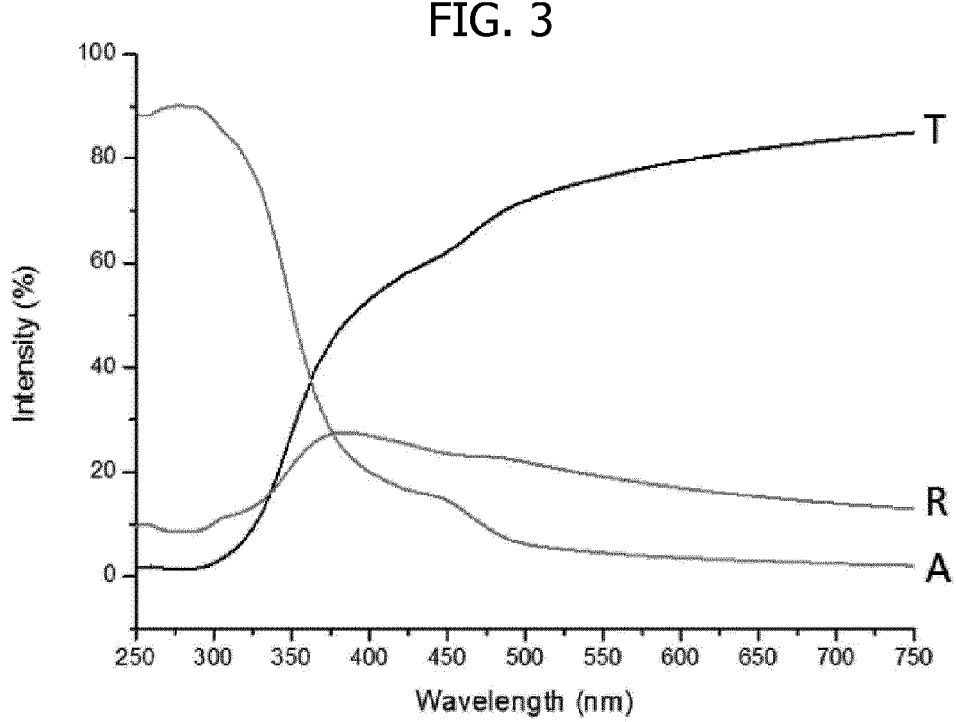
FIG. 3a, b shows graphs of optical properties of a transparent nanocomposite according to the present invention.
Figure 3:
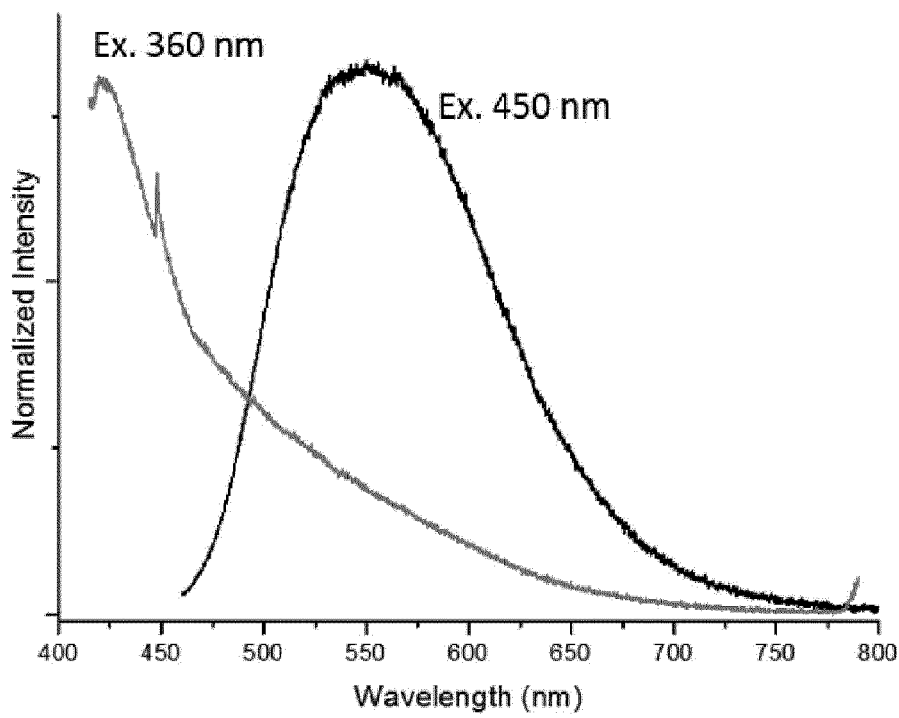
Figure 4:
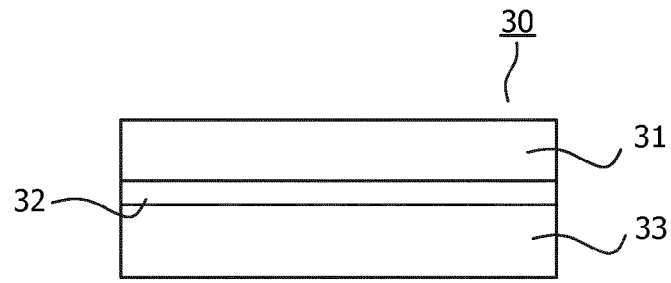
FIG. 4 shows a schematic depiction of a radiation detector module according to the present invention.

The improved nanocomposites of the present invention may then be processed further to be used in various applications, such as radiation detectors. FIG. 3 shows a highly simplified, schematic depiction of a radiation detector where a scintillator 31 is optically attached to a photodiode 32, which is mounted on an integrated circuit 33. Other configurations, such as vertical arrangements, other layers, pixelated detectors, etc., are also considered in the context of the present invention.

Figure 5:
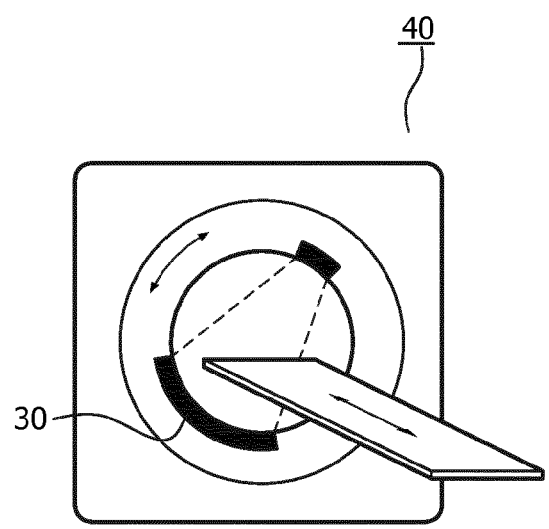
FIG. 5 shows a schematic depiction of an exemplary imaging system according to the present invention.

Said radiation detector 30 may then be incorporated in imaging systems 40, such as an x-ray imaging system, a CT imaging system 40 (as is schematically shown as an example in FIG. 5), a PET imaging system or SPECT imaging system. The improved nanocomposites may be further processed as the known nanocomposites and construction 106 of a radiation detector may be done using known techniques.

EXAMPLE 1

Polyurethane Filled with $Y_3Al_5O_{12}$:1% Ce Nanoparticles (~20 Vol. %)

11.498 g of Aluminium isopropoxide, 11.336 g of Yttrium acetate hydrate and 0.111 g of Cerium acetate hydrate were blended together with mixture of solvents: 1,4-butanediol and diethylene glycol in mass ratio 9:1. The colloidal solution was stirred on a hot plate for 3 hours with mild heating of 50 degrees Celsius. After the mixture was homogenized, it was poured into a high pressure autoclave vessel. Air present in the autoclave was flushed away with Argon before the mixture was heated to 225 degrees Celsius for 60 hours with a heating rate 1.5 degrees Celsius/min. At the end of process the mixture was cooled down to obtain a translucent yellowish suspension.

Next, 9 g of the obtained dehydrated suspension was rapidly mixed with 16 g of dehydrated 1,6-diisocyanatohexane and 1 drop of dibutyltin dilaurate. The viscous material was poured out into Teflon mold and kept in an oven at 60 degrees Celsius for 8 hours to obtain nanocomposite granules.

The nanocomposite granules were then introduced in an injection molder, melted down at 210 degrees Celsius and immediately cooled down in the mold.

FIG. 3(*a*) shows transmission T, reflection R and absorption A of the resulting transparent YAG:Ce-polyurethane nanocomposite. FIG. 3(*b*) shows luminescence under 450 and 360 nm excitation of the obtained nanocomposite. The scintillators of this example are transparent at visible wavelengths, but absorb at x-ray wavelengths, which make them suitable for use in CT and other x-ray radiation detectors. For PET, absorption should be at 511 keV. For other purposes absorption in UV or other wavelengths may be necessary. By selecting the right scintillating nanoparticle the absorption and emission wavelengths may be set, for instance using nanoparticles based on Eu or Tb.

Similar results are obtained for LGAG:Ce (checked with at least $Lu_2Gd_1Al_5O_{12}$:1% Ce) and LGGAG:CE (checked with at least $Lu_2Gd_1Al_4Ga_1O_{12}$:1% Ce), accounting for stoichiometric differences in the amounts. Particularly mixed garnet scintillators, such as LGGAG:Ce are difficult to obtain in sufficient transparency and quality. The method of the present invention also results for these type of scintillators in high transparency and high quality nanocomposites.

It is also possible to obtain a gel as matrix material, for instance a polyurethane gel, for the scintillator materials. Especially if the nanoparticle has luminescent properties, then several interesting applications may be produced using gel-based nanocomposites. For instance: flexible luminescent sheets (for instance for safety applications, in cloths, etc.) or health applications (e.g. to treat skin diseases with light. In this case the luminescence is excited optically). They might be applied in certain toys. Further, they can be used in the same sections as known (polyurethane or other) gels but with luminescent function: luminescent computer mouse-pad/keyboard wrist rests, luminescent bicycle parts, luminescent motorbike seating, luminescent shoe insole, luminescent padding parts for medical devices, luminescent sticky pads for holding cell phones and tablet computers, any conformal luminescent layer to cover a product, etc.

EXAMPLE 2

Polyurethane Gel (PU Gel) Filled with $Lu_2Gd_1Al_5O_{12}$:1% Ce Nanoparticles (~35 Vol. %)

6.008 g of Aluminium isopropoxide, 7.529 g of Lutetium acetate hydrate, 3.350 g of Gadolinium acetate hydrate and 0.104 g of Cerium acetate hydrate were blended together with mixture of solvents: 1,4-butanediol and diethylene glycol in mass ratio 9:1. The colloidal solution was stirred on a hot plate for 3 hours with mild heating of 50° C. After the mixture was homogenized, it was poured into a high pressure autoclave vessel. Air present in autoclave was flushed away with Argon. The mixture was heated to 225 degrees Celsius for 60 hours with a heating rate 1.5 degrees Celsius/min. At the end of process the mixture was cooled down and translucent yellowish suspension was obtained.

5 g of the obtained dehydrated suspension was rapidly mixed with 6.5 g of mixture of Polymeric MDI (a mixture of oligomeric polyisocyanates) and an MDI isomer (isocyanates (1-isocyanato-4-[(4 isocyanatophenyl)methyl] benzene). The resulting viscous polyurethane gel was poured out into Teflon mold.

The nanocomposite may be made into any shape or form (e.g. sheets, powder, shaped articles, foils, etc.) using the method of the present invention, as long as the precursor material disperses the nanoparticles well and (co-)polymerizes into an optically compatible matrix material for the scintillating nanoparticles. Curing is not limited to curing by heating. Other curing reactions, such as for instance UV polymerization and others known to the skilled person are also considered.

Nanoparticle composites of the present invention may be applied in various manners known to a skilled person, such as depositing, coating, printing, etc. They may be shaped by injection or other molding techniques, 3D printing and other techniques known to the skilled person.

While the invention has been illustrated and described in detail in the drawings and foregoing description, such illustration and description are to be considered illustrative or exemplary and not restrictive; the invention is not limited to the disclosed embodiments.

The term 'about' in the present application means that 10% under or over the given value is considered to be covered.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for producing a scintillator nanocomposite, the method comprising:
   introducing nanoparticles into a first dispersing medium to form a stable suspension, wherein the first dispersing medium is a precursor for a first matrix material; and
   curing the first dispersing medium to form the first matrix material,
   wherein the scintillator nanocomposite comprises the nanoparticles with scintillating properties and a diameter between 10 and 50 nanometer and the first matrix material.

2. The method according to claim 1, wherein the nanoparticles are garnet nanoparticles.

3. The method according to claim 1, wherein the first matrix material is a polymeric material.

4. The method according to claim 1, wherein the dispersing medium is a glycol.

5. The method according to claim 1, wherein a second dispersing medium is mixed with the first dispersing medium prior to introducing the nanoparticles or to the stable suspension, wherein the second dispersing medium is a precursor for a second matrix material.

6. The method according to claim 5, wherein the second matrix material is a polymeric material, preferably a polymeric material selected from the group of polyurethane, polyester, such as polybutylene terephthalate, unsaturated polyester resin, aromatic polyamide, aromatic polyimide, polystyrene or polysulfone.

7. The method according to claim 6, wherein the curing results in a co-polymer of the first matrix material and the second matrix material.

8. The method according to claim 1, wherein the curing is performed at elevated temperature, and/or at elevated pressure greater than 20 bar, and/or for at least 24 hours.

9. A scintillator nanocomposite comprising:
   nanoparticles with scintillating properties and a diameter between 10 and 50 nanometer; and
   a first matrix material; and
   wherein the nanoparticles are introduced into a first dispersing medium to form a stable suspension; and
   wherein the first matrix material is formed by curing the first dispersing medium.

10. The scintillator nanocomposite according to claim 9, wherein the first matrix material is polyurethane.

11. A product comprising the scintillator nanocomposite according to claim 9.

12. A method to produce a transparent scintillator comprising:
   melting a nanocomposite obtained with a method comprising introducing the nanoparticles into a first dispersing medium to form a stable suspension, wherein the first dispersing medium is a precursor for the first matrix material;

curing the first dispersing medium to form the first matrix material; and injection molding the molten nanocomposite; and wherein the scintillator nanocomposite comprises the nanoparticles with scintillating properties and a diameter between 10 and 50 nanometer and the first matrix material.

13. A transparent scintillator obtainable by the method according to claim 12.

14. A radiation detector comprising the transparent scintillator according to claim 13.

15. An imaging system comprising the radiation detector according to claim 14.

16. The method according to claim 2, wherein the nanoparticles are Cerium-doped nanoparticles.

17. The method according to claim 2, wherein the nanoparticles are chosen from the group of $Y_3Al_5O_{12}$:Ce nanoparticles, $(Lu,Gd)_3Al_5O_{12}$:Ce nanoparticles or (LGGAG:Ce) nanoparticles.

18. The method according to claim 3, wherein the polymeric material comprises a polymeric material selected from the group of polyurethane, polyester, polybutylene terephthalate, unsaturated polyester resin, aromatic polyamide, aromatic polyimide, polystyrene or polysulfone.

19. The method according to claim 4, wherein the glycol comprises a 1, 4 butanediol.

20. The method according to claim 8, wherein the elevated temperature is between 220 degrees Celsius and 250 degrees Celsius; and/or wherein the elevated pressure is about 40 bar.

* * * * *